(12) United States Patent
Tsubouchi

(10) Patent No.: US 7,891,468 B2
(45) Date of Patent: Feb. 22, 2011

(54) MOTOR-DRIVEN PARKING BRAKE APPARATUS

(75) Inventor: Kaoru Tsubouchi, Toyota (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 779 days.

(21) Appl. No.: 11/889,618

(22) Filed: Aug. 15, 2007

(65) Prior Publication Data

US 2008/0047788 A1 Feb. 28, 2008

(30) Foreign Application Priority Data

Aug. 24, 2006 (JP) ............................... 2006-227472

(51) Int. Cl.
*F16D 66/00* (2006.01)
(52) U.S. Cl. ................. 188/1.11 E; 188/2 D; 188/72.8; 188/156; 73/862.473
(58) Field of Classification Search ................ 188/2 D, 188/1.11 R, 1.11 E, 72.1, 72.7, 72.8, 156, 188/162; 73/774, 779, 862.473, 862.626
See application file for complete search history.

(56) References Cited

U.S. PATENT DOCUMENTS

| | | | |
|---|---|---|---|
| 6,244,394 B1 * | 6/2001 | Gutierrez et al. ............ 188/72.8 |
| 6,655,506 B2 * | 12/2003 | Pfeil et al. .................. 188/156 |
| 6,662,909 B2 * | 12/2003 | Taniguchi .................... 188/162 |
| 7,011,188 B2 * | 3/2006 | Scheuring et al. ............ 188/2 D |
| 7,341,127 B2 * | 3/2008 | Gil et al. ..................... 188/2 D |
| 7,441,632 B2 * | 10/2008 | Tachiiri et al. ........... 188/1.11 E |
| 7,445,092 B2 * | 11/2008 | Tachiiri et al. .............. 188/2 D |
| 7,490,699 B2 * | 2/2009 | Gil et al. ..................... 188/2 D |
| 7,648,006 B2 * | 1/2010 | Deutloff et al. ............. 188/2 D |
| 2006/0001316 A1 | 1/2006 | Tachiiri et al. |
| 2008/0047789 A1 * | 2/2008 | Tsubouchi .................. 188/156 |
| 2009/0186744 A1 | 7/2009 | Reitmeier |

FOREIGN PATENT DOCUMENTS

| | | |
|---|---|---|
| DE | 10 2006 025 704 B3 | 12/2007 |
| EP | 1 619 398 A1 | 1/2006 |
| JP | 2006-17158 A | 1/2006 |

OTHER PUBLICATIONS

Office Action issued Mar. 15, 2010 by the German Patent Office in German Patent Application No. 10 2007 000 460.7-21 and English language translation of German Official Action.

* cited by examiner

*Primary Examiner*—Robert A Siconolfi
*Assistant Examiner*—Mariano Sy
(74) *Attorney, Agent, or Firm*—Buchanan Ingersoll & Rooney PC

(57) ABSTRACT

A motor-driven parking brake apparatus includes a load sensor (pressure sensor) for detecting axial load of a screw shaft. The pressure sensor includes a transmission member which receives the axial load via a circular surface of a plate, and a casing which accommodates the transmission member and receives the axial load via the transmission member. This casing has a circular opening having an opening area smaller than the surface of the circular surface. The pressure sensor detects a pressure generated due to a load received from an exposed portion of the transmission member which is exposed from the circular opening. Due to characteristics of the transmission member, the load received from the exposed portion is a portion of the axial load and proportional to the axial load.

7 Claims, 6 Drawing Sheets

MOTOR-DRIVEN PARKING BRAKE APPARATUS

CROSS REFERENCE TO RELATED APPLICATION

This application is based on and claims under 35 U.S.C. sect, 119 with respect to Japanese Patent Application No. 2006-227472 filed on Aug. 24, 2006, the entire content of which is incorporated herein by reference.

BACKGROUND OF THE INVENTION

1. Field of the Invention

The present invention relates to a motor-driven parking brake apparatus, and is applicable to, for example, a parking brake apparatus for a vehicle.

2. Description of the Related Art

Japanese Patent Application Laid-Open (kokai) No. 2006-17158 discloses a motor-driven parking brake apparatus which includes an electric motor; a shaft member which rotates about its axis upon receipt of rotational drive torque of the motor through one end of the shaft member; a conversion mechanism which converts rotational motion of the shaft member to translational motion of a translational movement portion; a cable having a first end connected to the translational movement portion; a parking brake connected to a second end of the cable; a load sensor for detecting axial load from the other end of the shaft member, the load being generated due to the tension of the cable; and a controller for controlling the electric motor on the basis of output of the load sensor.

In the motor-driven parking brake apparatus, since the load sensor detects the total axial load of the shaft member (hereinafter referred to as "total load"), the load sensor receives a large load. Therefore, the motor-driven parking brake apparatus has a problem in that the size of the load sensor must be increased in order to secure the strength of the load sensor.

SUMMARY OF THE INVENTION

The present invention has been accomplished in order to solve the above-described problem, and an object of the present invention is to provide a motor-driven parking brake apparatus which can reduce the size of a load sensor.

The present invention is applied to a motor-driven parking brake apparatus of the above-described type and is characterized in that the load sensor is configured to detect a portion of axial load of the shaft member (the portion being proportional to the axial load of the shaft member). By virtue of this configuration, only a portion of the total load (i.e., axial load of the shaft member) is detected by the load sensor. Therefore, the size of the load sensor can be reduced as compared with the case where the load sensor detects the total load.

Preferably, the load sensor may includes an elastic member which receives via a predetermined surface thereof axial load of the shaft member, and an accommodation member which accommodates the elastic member and receives the axial load of the shaft member via the elastic member, wherein the accommodation member has an opening of an area smaller than the area of the predetermined surface, and the load sensor is configured to detect the load received from an exposed portion of the elastic member exposed from the opening.

When the elastic member accommodated within the accommodation member receives a certain load via a predetermined surface thereof, the ratio between the magnitude of the certain load and the magnitude of the load which is transmitted to the outside from the exposed portion of the elastic member exposed from the opening (not facing the predetermined surface) of the accommodation member tends to be equal to the ratio between the area of the predetermined surface and the area of the opening. Accordingly, the above-described configuration enables the load sensor to detect the load received from the exposed portion, which is a portion of the total load and proportional to the total load, by making use of the above-described tendency produced by the elastic member.

In the motor-driven parking brake apparatus according to the present invention, preferably, a bearing for reducing frictional torque which the shaft member receives due to rotation of the shaft member is disposed between the predetermined surface of the elastic member and the other end of the shaft member. This configuration reduces a drop in drive efficiency of the electric motor stemming from the frictional torque which the shaft member receives due to rotation of the shaft member.

The load sensor may be a pressure sensor which detects a pressure generated due to the load received from the exposed portion of the elastic member (that is, pressure generated at the exposed portion). When the elastic member receives the total load, a pressure is generated at the exposed portion. This pressure tends to be proportional to the total load, and accordingly, proportional to a portion of the total load. Therefore, the above-described configuration enables a portion of the total load (i.e., the load received from the exposed portion) to be detected through detection of the pressure generated at the exposed portion.

The load sensor may be a displacement sensor which detects an amount by which the exposed portion of the elastic member projects into the opening due to deformation of the exposed portion. When the elastic member receives the total load, the exposed portion projects into the opening due to deformation of the exposed portion. The amount of projection (hereinafter referred to "projection amount") of the exposed portion of the elastic member tends to be proportional to the total load, and accordingly, proportional to a portion of the total load. Therefore, the above-described configuration enables a portion of the total load to be detected through detection of the projection amount.

When the displacement sensor is used as the load sensor, preferably, the displacement sensor includes a movable member which moves in accordance with the projection amount of the exposed portion of the elastic member; a magnet which moves together with the movable member; and an element which generates an electrical output corresponding to movement of the magnet, wherein the load received from the exposed portion of the elastic member is detected on the basis of the electrical output of the element. This configuration enables the projection amount (i.e., a portion of the total load, which is the load received from the exposed portion) to be detected through detection of displacement of the movable member (i.e., the magnet) which moves in accordance with the projection amount.

In this case, preferably, the displacement sensor includes first urging means for urging the movable member in a direction opposite the direction in which the exposed portion of the elastic member projects. This configuration causes the exposed portion and the movable member to come into contact with each other at all times. Accordingly, the projection amount, which changes momentarily, can be detected accurately.

In the case where the displacement sensor includes the first urging means, preferably, the displacement sensor further includes second urging means for allowing the entire elastic member to move in accordance with the axial load of the shaft member within a range where the axial load of the shaft member is less than a predetermined value, so that within the range where the axial load of the shaft member is less than a predetermined value, the movable member moves in accordance with an amount of movement of the entire elastic member within the accommodation member rather than the projection amount of the exposed portion of the elastic member.

By virtue of this configuration, when the total load is less than the predetermined value, the rate of change in displacement of the movable member to change in the total load (hereinafter may be simply referred to as "displacement change rate") is determined by the characteristics of the second urging means, and when the total load is equal to or greater than the predetermined value, the "displacement change rate" is determined by the characteristics of the first urging means and the elasticity of the elastic member (projecting characteristic of the exposed portion).

Accordingly, the "displacement change rate" for the case where the total load is less than the predetermined value can be set to be greater than that for the case where the total load is equal to or greater than the predetermined value. By virtue of this configuration, for example, in the case of determining whether or not to end a control of bringing the parking brake from a braking state to a release state (hereinafter, this determination will be referred to as "release determination") is performed through detection that the movable member has reached a position corresponding to decrease of the total load to a predetermined, small value (which is smaller than the predetermined value and approximately zero), the accuracy of the release determination can be increased. As a result, it is possible to suppress occurrence of a situation where relatively large cable tension remains after the release determination (so-called dragging of the brake).

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will be described with reference to the drawings.

First Embodiment

Figure 1:
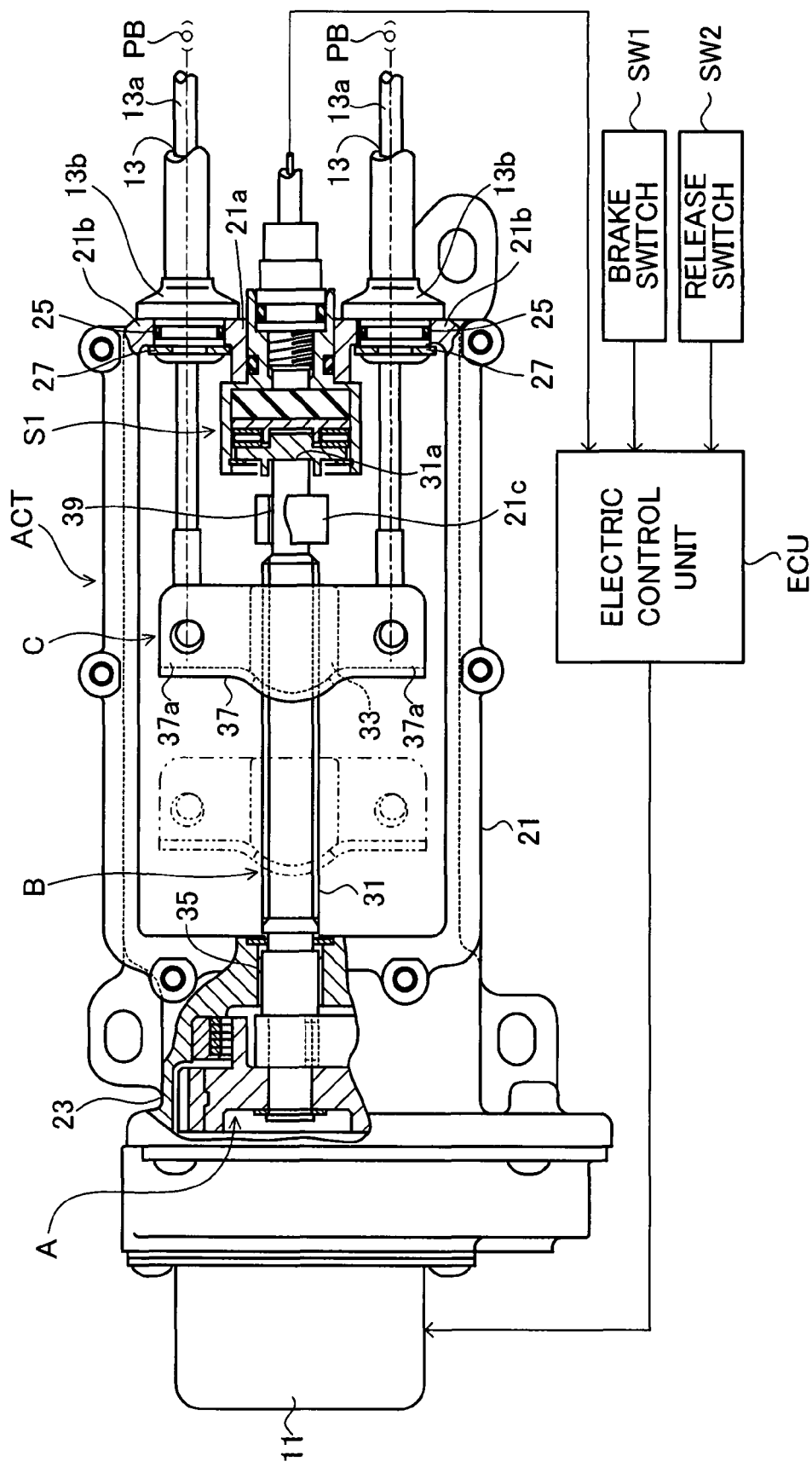
FIG. 1 is a partial cutaway plan view showing a motor-driven parking brake apparatus according to a first embodiment of the present invention.

FIG. 1 shows a motor-driven parking brake apparatus for an automobile according to a first embodiment of the present invention. This motor-driven parking brake apparatus includes an actuator section ACT, a pair of parking brakes PB driven by the actuator section ACT, and an electric control unit ECU which controls the actuator section ACT. The actuator section ACT includes a speed reduction mechanism A for transmitting rotational drive torque of an electric motor 11, while reducing the rotational speed; a conversion mechanism B for converting rotational motion, transmitted by the speed reduction mechanism A, into translational motion; an equalizer mechanism C which distributes force produced by the translational motion to two output portions; a pair of cables 13 whose first ends are connected to the corresponding output portions of the equalizer mechanism C and whose second ends are connected to the corresponding parking brakes PB; and a pressure sensor S1 (load sensor) which detects pressure generated due to axial load of a screw shaft 31 (shaft member) to be described later, the axial load being proportional to tension of the pair of cables 13 (cable tension).

Operation of the electric motor 11 is controlled by means of the electric control apparatus ECU on the basis of signals from a brake switch SW1, a release switch SW2, and the pressure sensor S1.

The speed reduction mechanism A is composed of an unillustrated multi-stage train of reduction gears, which are assembled in a casing 23 attached to a housing 21. The speed reduction mechanism A transmits rotational drive torque of the electric motor 11 to a first end of the screw shaft 31, while reducing the rotational speed.

The conversion mechanism B includes the above-mentioned screw shaft 31, and a nut 33 in screw engagement with the screw shaft 31. The screw shaft 31 is assembled to the housing 21 such that the screw shaft 31 is rotatable and axially movable, via a bearing 35 provided at the first end of the screw shaft 31, a bearing 39 accommodated in a support 21c fixed to the housing 21 at a second end of the screw shaft 31, and the above-described pressure sensor S1, which functions as a thrust bearing, is provided at the second end of the screw shaft 31, and assembled to an axial load-receiving portion 21a of the housing 21. By virtue of the above-described configuration, the screw shaft 31 rotates about its axis upon receipt of the rotational drive torque of the electric motor 11 through the first end of the screw shaft 31, and axial load of the screw shaft 31 is transmitted to the pressure sensor S1. When the screw shaft 31 is driven to rotate in the regular direction, the nut 33 is moved (effects translational motion) along the axial direction of the screw shaft 31 from a release position indicated by a solid line in FIG. 1 to a braking position indicated by a two-dot chain line in FIG. 1. When the screw shaft 31 is driven to rotate in the reverse direction, the nut 33 is moved (effects translational motion) along the axial direction of the screw shaft 31 toward the release position indicated by the solid line in FIG. 1.

The equalizer mechanism C equally distributes the force generated as a result of the translational motion and acting on the nut 33 to the two output portions, and is composed of a lever 37 attached to the nut 33. The lever 37 is assembled, at its central portion, to the nut 33 so as to be swingable by a predetermined amount. End portions of inner wires 13a of the cables 13 are rotatably connected to a pair of arms 37a, which are the two output portions. First ends 13b of outer tubes of the cables 13 are fixedly inserted into circular mount holes of a pair of cable reaction-receiving portions 21b of the housing 21 via O-rings 25, and are prevented from coming off the holes by means of clips 27. The nut 33 and the lever 37 constitute a translational movement portion.

The axial load-receiving portion 21a and cable reaction-receiving portions 21b of the housing 21 will be described further. When the parking brakes PB are in a braking state; i.e., when the above-described cable tension (>0) is generated, the axial load-receiving portion 21a of the housing 21 receives the entire axial load of the screw shaft 31 (i.e., the above-described total load) via the transmission member 45, and the cable reaction-receiving portions 21b of the housing 21 receive reactions from the cables 13 via the first ends 13b of the outer tubes.

Since the axial load-receiving portion 21a and the cable reaction-receiving portions 21b, which receive large loads, are located close to one another, securing of strength is easy, and these portions are not required to have an excessively large wall thickness. Further, the axial load and the reactions from the cables 13 do not act on the remaining portion of the housing 21, whereby the wall thickness of the remaining portion can be reduced.

That is, the axial load-receiving portion 21a and the paired cable reaction-receiving portions 21b (three portions in total) are disposed at one side (right side in FIG. 1) of the housing 21 to be located close to one another, and the axial load-receiving portion 21a is provided between the paired cable reaction-receiving portions 21b. Therefore, the size of the housing 21 can be reduced.

Figure 2:
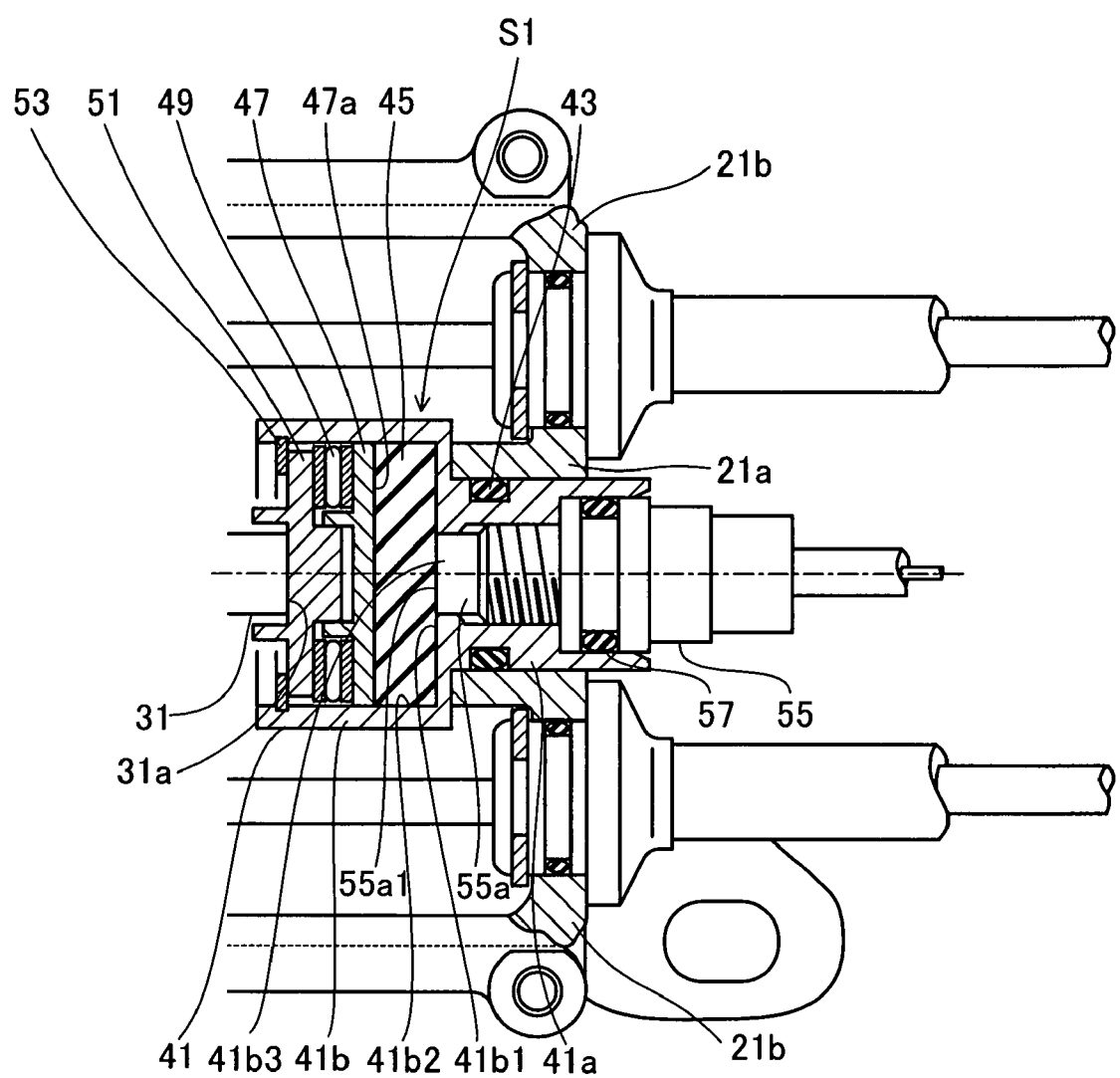
FIG. 2 is an enlarged view of the pressure sensor shown in FIG. 1.

As shown in FIG. 2, which is an enlarged view of the pressure sensor S1, the pressure sensor S1 includes a casing 41 (accommodation member), which assumes the form of a stepped cylindrical tube, and has a generally cylindrical base portion 41a (smaller diameter portion), and a cylindrical cup portion 41b (larger diameter portion) integral with the base portion 41a.

The base portion 41a is inserted into and fixed to a circular mount hole of the axial load-receiving portion 21a of the housing 21 via an O-ring 43 to be coaxial with the screw shaft 31. Notably, the base portion 41a is fixed to the housing 21 by means of an unillustrated screw embedded in the axial load-receiving portion 21a such that the base portion 41a is immobilized in the rotational and axial directions. The cylindrical cup portion 41b is fixed to the housing 21 so that the cylindrical cup portion 41b is disposed within the housing 21 coaxially with the screw shaft 31 and is opened toward the second end 31a of the screw shaft 31.

A disk-shaped transmission member 45 (elastic member) formed of an elastomer material such as rubber is accommodated in the cylindrical columnar interior space of the cylindrical cup portion 41b coaxially with the screw shaft 31 so that the transmission member 45 comes in close contact with a bottom surface (flat surface) of a bottom portion 41b1 of the cylindrical cup portion 41b and an inner cylindrical surface 41b2 of the cylindrical cup portion 41b. A disk-shaped plate 47, a bearing 49, and a disk-shaped plate 51 are disposed between the transmission member 45 and the second end 31a of the screw shaft 31 in such a manner that these members are axially stacked in this sequence as viewed from the side toward the transmission member 45 and are coaxial with the screw shaft 31. A surface of the plate 51 facing the screw shaft 31 is always in contact with the second end 31a of the screw shaft 31. The plate 47 (along with the bearing 49 and the plate 51) is held by means of a clip 53 fixed to the cylindrical cup portion 41b, so that the plate 47 is prevented from coming out of the cylindrical columnar interior space of the cylindrical cup portion 41b.

The plate 47, the bearing 49, and the plate 51 can axially move within the cylindrical columnar interior space of the cylindrical cup portion 41b. By virtue of this structure, the transmission member 45 receives the above-mentioned total load from a circular surface 47a of the plate 47 via the plate 51, the bearing 49, and the plate 47, where the circular surface 47a is in close contact with the transmission member 45; and the casing 41 (the bottom portion 41b1 of the cylindrical cup portion 41b thereof) receives the axial load of the screw shaft 31 via the transmission member 45.

The bearing 49 permits relative rotation between the plate 47 and the plate 51 about the axis. Thus, when the screw shaft 31 rotates, the plate 51 smoothly rotates together with the screw shaft 31, but the plate 47 and the transmission member 45 do not rotate. Since the bearing 49 reduces frictional torque which the second end 31a of the screw shaft 31 receives due to rotation of the screw shaft 31, a drop in drive efficiency of the electric motor 11 stemming from the frictional torque can be reduced.

A circular opening 41b3 is formed in the bottom portion 41b1 of the cylindrical cup portion 41b coaxially with the screw shaft 31 so as to connect the cylindrical columnar interior space of the cylindrical cup portion 41b and that of the base portion 41a. Thus, a circular portion of the transmission member 45 corresponding to the circular opening 41b3 (hereinafter referred to as "exposed portion") is exposed to the cylindrical columnar interior space of the base portion 41a.

A known pressure detection element 55 is screwed into the cylindrical columnar interior space of the base portion 41a coaxially with the screw shaft 31 via an O-ring 57. A cylindrical columnar end portion 55a of the pressure detection element 55 on the side toward the screw shaft 31 is fitted into the circular opening 41b3. A circular end surface of the cylindrical columnar end portion 55a constitutes a pressure detection surface 55a1.

The pressure detection surface 55a1 forms a single circular surface in cooperation with the bottom surface of the bottom portion 41b1 of the cylindrical cup portion 41b, and the pressure detection surface 55a1 is in close contact with the above-described exposed portion of the transmission member 45. As can be understood from above, the transmission member 45 is accommodated within a fixed cylindrical columnar closed space defined by the bottom surface of the bottom portion 41b1 of the cylindrical cup portion 41b, the inner cylindrical surface 41b2 of the cylindrical cup portion 41b, the circular surface 47a of the plate 47, and the pressure detection surface 55a1, and is in close contact with these surfaces.

Figure 3:
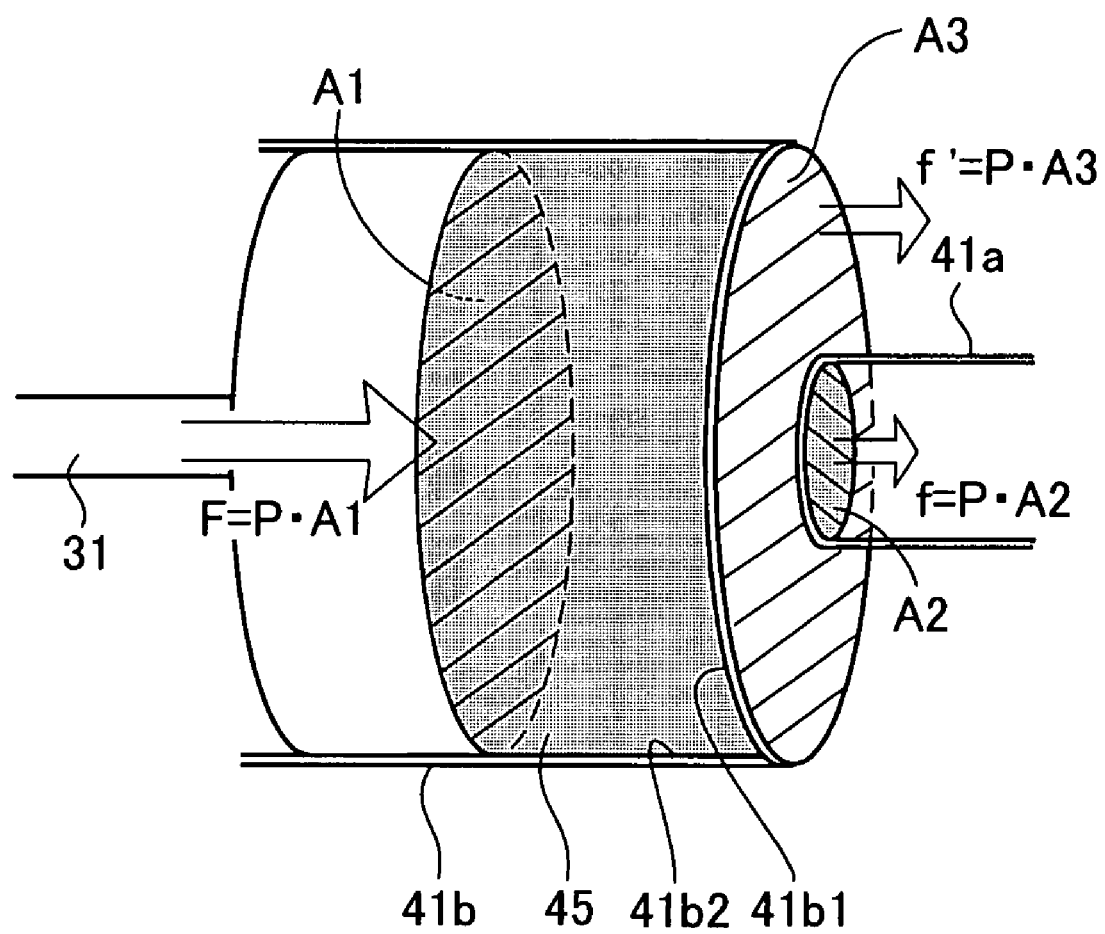
FIG. 3 is a diagram used for explaining operation of the pressure sensor shown in FIG. 1.

Operation of the pressure sensor S1 having the above-described structure will be described with reference to FIG. 3, which schematically shows the transmission member 45 and the vicinity thereof. When the transmission member 45 axially receives the above-described total load from the circular surface 47a of the plate 47, a pressure corresponding to the total load is produced uniformly over the entire surface of the transmission member 45 accommodated in the closed space. Here, when the area of the circular surface 47a is represented by A1, the total load is represented by F, and the pressure is represented by P, a relation $F = P \cdot A1$ stands.

The pressure P is also produced uniformly on the exposed portion. Accordingly, the pressure detection surface 55a1 uniformly receives the pressure P. When the area of the exposed portion is represented by A2, the pressure detection surface 55a1 receives a load $f = P \cdot A2$ ($= F \cdot (A2/A1)$). Since a relation $A2 < A1$ stands, the load f is a portion of the total load F, and assumes a value proportional to the total load F. In other words, the pressure sensor S1 detects the load f, which is a portion of the total load F, by detecting the pressure P. Notably, the load f is received by the axial load-receiving portion 21a of the housing 21 via the base portion 41a. Further, when the area of contact between the transmission member 45 and the bottom surface of the bottom portion 41b1 is represented by A3, a load f=P·A3 is received by the axial load-receiving portion 21a as in the case of the load f.

The load f is proportional to the total load F, and the total load F is proportional to the above-described cable tension, as described above. Accordingly, the electric control apparatus ECU can control the electric motor 11 on the basis of the load f detected by the pressure sensor S1 so as to control the cable tension.

Next, operation of the motor-driven parking brake apparatus of the first embodiment having the above-described structure will be described. When a driver operates the brake switch SW1 (release switch SW2), the electric motor 11 is driven to rotate in the regular direction (reverse direction), whereby the screw shaft 31 of the conversion mechanism B is rotated in the regular direction (reverse direction). As a result, the equalizer mechanism C moves from the release position indicated by the solid line in FIG. 1 (brake position indicated by the two-dot chain line in FIG. 1) to the brake position (release position). Therefore, the inner wires 13a of the cables 13 are pulled (released), so that the parking brakes PB are brought into a braking state (release state).

The rotation of the electric motor 11 in the regular direction is stopped when the pressure P detected by the pressures sensor S1 reaches a predetermined brake determination pressure. The rotation of the electric motor 11 in the reverse direction is stopped when the pressure P detected by the pressures sensor S1 reaches a predetermined release determination pressure (<the brake determination pressure; approximately zero).

As described above, in the motor-driven parking brake apparatus according to the first embodiment of the present invention, since the load detected by the pressure sensor S1 is a portion of the total load F, the pressure sensor S1 can be downsized as compared with the case where the pressure sensor S1 detects the total load F itself.

Second Embodiment

Figure 4:
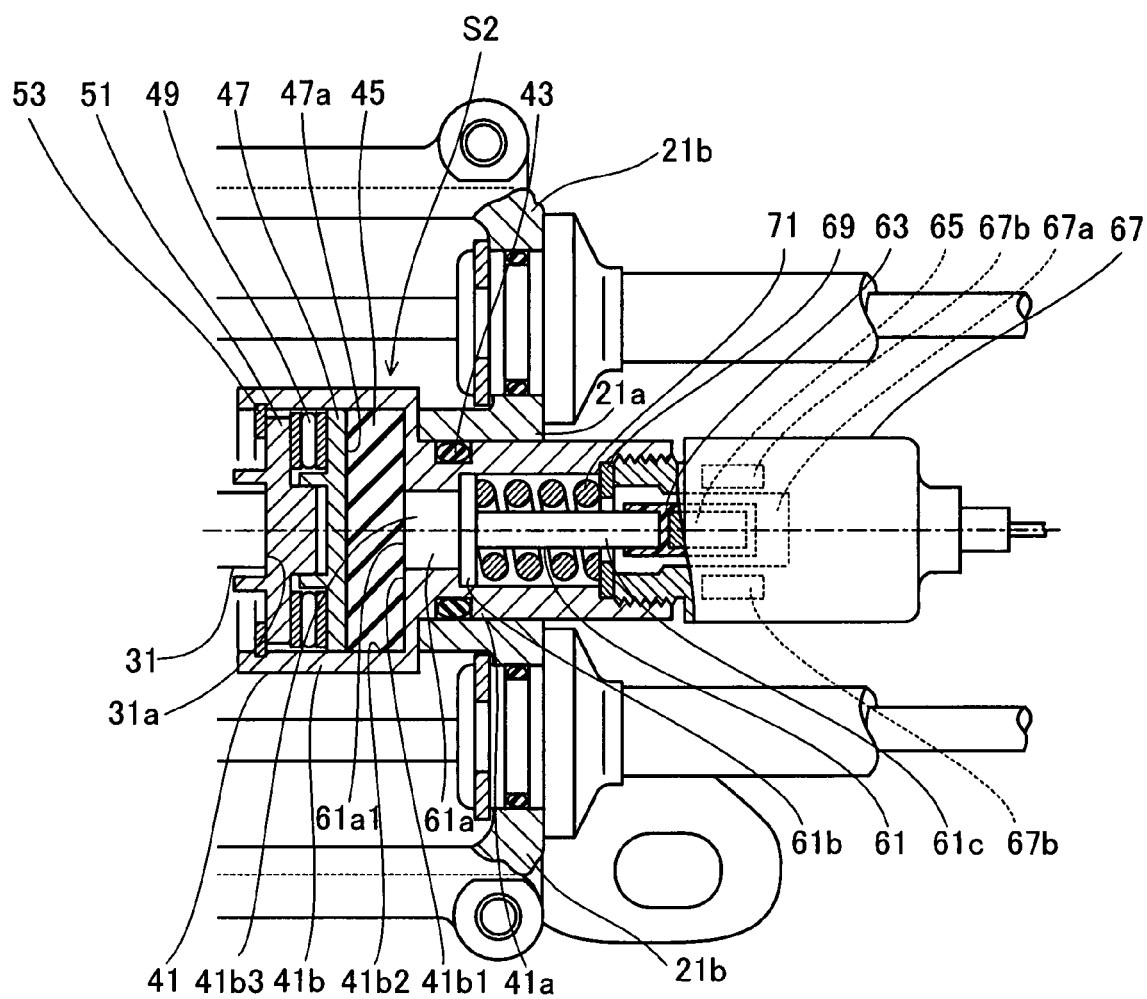
FIG. 4 is an enlarged view of a displacement sensor provided in a motor-driven parking brake apparatus according to a second embodiment of the present invention.

Next, a motor-driven parking brake apparatus according to a second embodiment of the present invention will be described. This second embodiment differs from the first embodiment only in the point that in place of the pressure sensor S1, a displacement sensor S2 is used as a load sensor for detecting the axial load of the screw shaft 31. Hereinbelow, only the point of difference will be described with reference to FIG. 4, which is an enlarged view of the displacement sensor S2. In FIG. 4, members and portions identical with or equivalent to those shown in FIG. 2 are denoted by like reference numerals, and their descriptions will not be repeated. For each of the axially movable members shown in FIG. 4, a corresponding axial position in a state shown in FIG. 4 (when the total load F is zero) is referred to as "original position."

A spool 61 (movable member), which assumes the form of a stepped cylindrical tube and has a larger diameter portion 61a, a flange portion 61b, and a smaller diameter portion 61c, is accommodated in the cylindrical columnar interior space of the base portion 41a of the casing 41 of the displacement sensor S2 such that the spool 61 is coaxial with the screw shaft 31 and can move in the axial direction.

As in the case of the cylindrical columnar end portion 55a of the above-described pressure detection element 55, the larger diameter portion 61a is fitted into the circular opening 41b3. A cylindrical columnar magnet 65 is fixedly attached to a distal end portion of the smaller diameter portion 61c via a resin member 63 to be coaxial with the smaller diameter portion 61c (i.e., coaxial with the screw shaft 31).

A displacement detection element 67 electrically connected to the electric control unit ECU is screwed into an end portion of the base portion 41a opposite the screw shaft 31 via a spring retainer 69 to be coaxial with the screw shaft 31.

The magnet 65 extends into a cylindrical columnar interior space 67a formed in the displacement detection element 67 coaxially with the screw shaft 31. A plurality of Hall IC elements 67b are fixedly disposed within the displacement detection element 67 to face the cylindrical surface of the magnet 65 with a predetermined gap and surround the circumference of the magnet 65. With this arrangement, the displacement detection element 67 can detect the axial position of the magnet 65 (accordingly, the spool 61).

In the cylindrical columnar interior space of the base portion 41a, a coil spring 71 (first urging means) is disposed between the flange portion 61b of the spool 61 and the spring retainer 69 with the initial load (load when the spool 61 is located at the original position) being set to zero. A circular end surface 61a1 of the larger diameter portion 61a (corresponding to the pressure detections surface 55a1 of the above-described pressure detection element 55) is in contact with the exposed portion of the transmission member 45 at the original position. Thus, at the original position, the axial position of the circular end surface 61a1 coincides with the bottom surface of the bottom portion 41b1 of the cylindrical cup portion 41b (see FIG. 4).

Operation of the displacement sensor S2 having the above-described structure will be described with reference to FIG. 4 corresponding to FIG. 2. In the case of the second embodiment, unlike the above-described pressure detection surface 55a1, which cannot move in the axial direction, the circular end surface 61a1 of the spool 61 can move rightward in FIG. 4 against the elastic force of the coil spring 71.

Accordingly, when the transmission member 45 axially receives the above-described total load F from the circular surface 47a of the plate 47, the exposed portion of the transmission member 45 deforms and projects into the circular opening 41b3 while pushing the spool 61 (the circular end surface 61a1 thereof) rightward in FIG. 4. In other words, the spool 61 moves rightward in FIG. 4 from the original position over a distance corresponding to the amount of projection of the exposed portion into the circular opening 41b3 (hereinafter referred to as "projection amount").

The projection amount tends to be proportional to the total load F. Therefore, the axial displacement of the spool 61 from the original position (hereinafter referred to as the "displacement of the spool 61") is proportional to the total load F. In other words, the displacement sensor S2 detects the above-described load f, which is a portion of the total load F, by detecting the axial displacement of the spool 61 from the original position. Accordingly, as in the case of the above-described pressure sensor S1, the electric control apparatus ECU can control the electric motor 11 on the basis of the load f detected by the displacement sensor S2 so as to control the cable tension.

Specifically, the rate of change in the displacement of the spool 61 to change in the total load F is determined by the spring constant of the coil spring 71, and the elastic characteristics (e.g., elastic modulus) of the transmission member 45 (the projecting characteristic of the exposed portion). The rotation of the electric motor 11 in the regular direction is stopped when the displacement of the spool 61 detected by the displacement sensor S2 reaches a predetermined brake determination position. The rotation of the electric motor 11 in the reverse direction is stopped when the displacement of the spool 61 detected by the displacement sensor S2 reaches a predetermined release determination position (closer to the original position than the brake determination position; approximately the original position).

As described above, in the motor-driven parking brake apparatus according to the second embodiment of the present invention, the load detected by the displacement sensor S2 is also a portion of the total load F; therefore, the displacement sensor S2 can be downsized as compared with the case where the displacement sensor S2 detects the total load F itself.

In the above-described second embodiment, when an amount of rightward movement of the spool 61 from the original position in FIG. 4 is represented by $\delta$, the projection volume of the exposed portion of the transmission member 45 is approximated by A2·$\delta$, and the amount of rightward movement of the screw shaft 31 from the original position is approximated by A2·$\delta$/A1, and is very small. That is, the ratio of increase in the movement amount of the screw shaft 31 to increase in the cable tension is small. Accordingly, rotation loss of the electric motor 11 associated with movement of the screw shaft 31 becomes very small, and the drive efficiency of the electric motor 11 becomes high. That is, cable moving loss of the inner wires 13a of the paired cables 13 produced upon movement of the screw shaft 31 becomes very small, and the operation efficiency of the apparatus becomes high.

Third Embodiment

Figure 5:
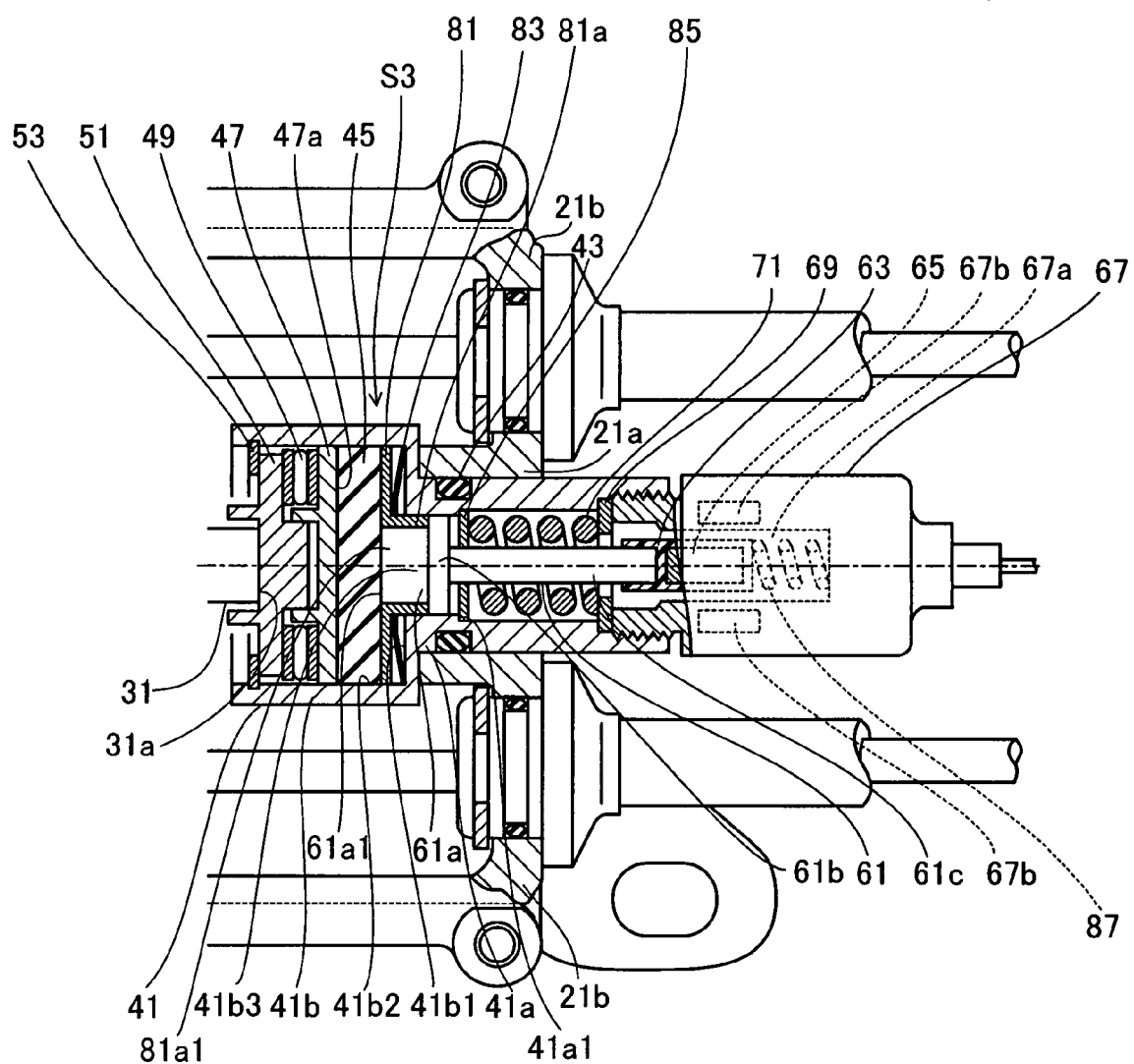
FIG. 5 is an enlarged view of a displacement sensor provided in a motor-driven parking brake apparatus according to a third embodiment of the present invention.

Next, a motor-driven parking brake apparatus according to a third embodiment of the present invention will be described. This third embodiment differs from the second embodiment only in the point that in place of the displacement sensor S2, a displacement sensor S3 is used as a load sensor for detecting the axial load of the screw shaft 31. Hereinbelow, only the point of difference will be described with reference to FIG. 5, which is an enlarged view of the displacement sensor S3. In FIG. 5, members and portions identical with or equivalent to those shown in FIG. 4 are denoted by like reference numerals, and their descriptions will not be repeated. For each of the axially movable members shown in FIG. 5, a corresponding axial position in a state shown in FIG. 5 (when the total load F is zero) is referred to as "original position."

In the cylindrical columnar interior space of the cylindrical cup portion 41b of the casing 41 of the displacement sensor S3, a ring-shaped washer 81 and a disk spring 83 (second urging means) are disposed between the transmission member 45 and the bottom surface of the bottom portion 41b1 of the cylindrical cup portion 41b to be coaxial with the screw shaft 31 and axially movable. The washer 81 has a cylindrical tubular projecting portion 81a which is coaxial with the washer 81 and is fitted into the circular opening 41b3. The disk spring 83 has a zero initial load (load when the washer 81 is located at the original position).

By virtue of the above configuration, the washer 81, the transmission member 45, the plate 47, the bearing 49, the plate 51 (hereinafter collectively referred to as the "unitarily moving members") can relatively move in the axial direction within the cylindrical cup portion 41b from the original position to a position where the disk spring 83 sets (a position shifted rightward from the original position in FIG. 5). In the third embodiment, a portion of the transmission member 45 exposed from a cylindrical hole 81a1 of the cylindrical tubular projecting portion 81a (corresponding to the circular opening 41b3 of the second embodiment) corresponds to the above-described exposed portion.

The larger diameter portion 61a of the spool 61 is inserted into the cylindrical hole 81a1. The spool 61 is always urged toward the original position (leftward in FIG. 5) by means of a very small elastic force (almost ignorable) of a coil spring 87 provided in the cylindrical columnar interior space 67a of the displacement detection element 67. By virtue of this configuration, at the original position, the flange portion 61b comes into contact with an end surface of the cylindrical tubular projecting portion 81a, and the axial position of the circular end surface 61a1 of the larger diameter portion 61a coincides with the axial position of the surface (flat surface) of the washer 81 on the side toward the screw 31. That is, at the original position, the circular end surface 61a1 of the larger diameter portion 61a is in contact with the exposed portion of the transmission member 45. Further, the spool 61 axially moves together with the unitarily moving members in response to relative movement of the unitarily moving members.

A step portion 41a1 is formed on the inner cylindrical surface of the base portion 41a of the casing 41 of the displacement sensor S3. A washer 85 is inserted into this stepped cylindrical interior space to be coaxial with the spool 61 and movable in the axial direction within a range extending rightward from the step portion 41a1 in FIG. 5.

The coil spring 71 is disposed between the washer 85 and the spring retainer 69 with the initial load (load when the washer 85 is located at the original position) being set to zero. Thus, at the original position, the washer 85 is in engagement with the step portion 41a1. At the original portion, a gap of a distance equal to the distance over which the unitarily moving members can move relatively is formed between the flange portion 61b of the spool 61 and the washer 85. That is, the flange portion 61b and the washer 85 come into contact in the axial direction only in a state where the disc spring 83 sets. Notably, the state where the disc spring 83 sets means a state where the axial height of the disk spring 83 comes to a minimum or the disc spring 83 comes into complete contact with the bottom surface of the bottom portion 41b1 of the cylindrical cup portion 41b.

Figure 6:
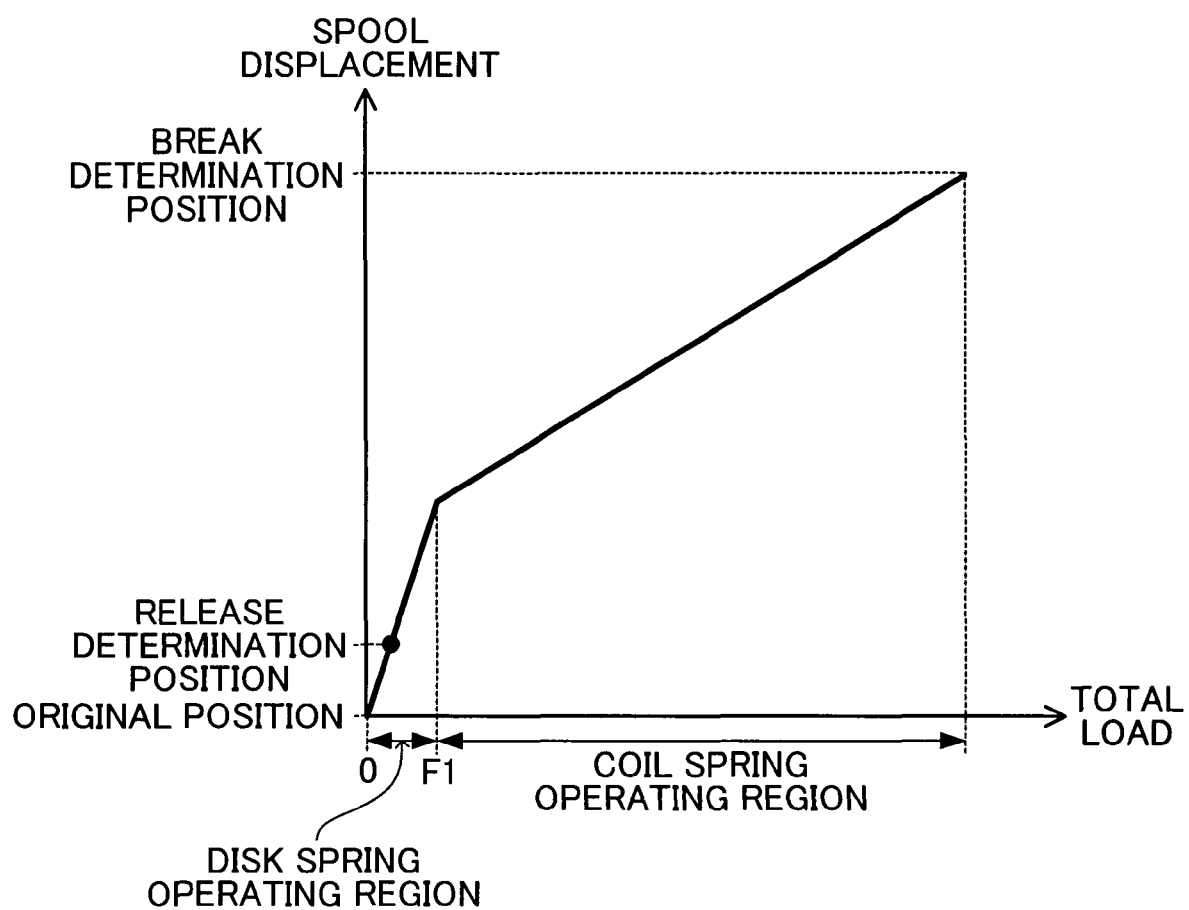
FIG. 6 is a graph showing the relation between displacement of a spool and total load.

Operation of the displacement sensor S3 having the above-described structure will be described with reference to FIG. 5 corresponding to FIG. 4, and FIG. 6 showing the relation between displacement of the spool 61 and the total load F.

When the total load F is less than a load at which the disk spring 83 sets (setting load F1 corresponding to the above-described "predetermined value") (hereinafter referred to as a "disk spring operating region"), in accordance with the total load F, the above-described unitarily moving members (accordingly, the spool 61) move rightward from the original position in FIG. 5 against the elastic force of the disk spring 83. Notably, in the disk spring operating region, the total load F is very small, and therefore, the projection amount of the exposed portion of the transmission member 45 is very small and ignorable. Accordingly, in the disk spring operating region, the rate of change in displacement of the spool 61 to change in the total load F is determined by the spring constant of the disk spring 83.

When the total load F is equal to or greater than the setting load F1 (hereinafter referred to as a "coil spring operating region"), relative movement of the unitarily moving members becomes impossible, and due to engagement between the flange portion 61b and the washer 85, the above-mentioned exposed portion becomes possible to push the spool 61 rightward in FIG. 5 against the elastic force of the coil spring 71. Accordingly, in the coil spring operating region, as in the second embodiment, the rate of change in displacement of the spool 61 to change in the total load F is determined by the spring constant of the coil spring 71 and the elastic characteristics of the transmission member 45.

As shown in FIG. 6, in the third embodiment, the elastic characteristics of the transmission member 45, the spring constant of the coil spring 71, and the spring constant of the disk spring 83 are set such that the rate of change in displacement of the spool 61 in the disk spring operating region is greater than that in the coil spring operating region. In addition, the above-described release determination position in the control of bringing the parking brakes PB from the braking state to the release state is set to a position corresponding to the disk spring operating region. Accordingly, in the third embodiment, the accuracy of the above-described release determination can be increased.

What is claimed is:

1. A motor-driven parking brake apparatus comprising:
   an electric motor;
   a shaft member which rotates about its axis upon receipt of rotational drive torque of the motor through one end of the shaft member;
   a conversion mechanism which converts rotational motion of the shaft member to translational motion of a translational movement portion;
   a cable having a first end connected to the translational movement portion;
   a parking brake connected to a second end of the cable;
   a load sensor configured to detect a portion of axial load received from the other end of the shaft member, the load being generated due to tension of the cable;
   the load sensor including:
      an elastic member which receives, via a predetermined surface of the elastic member, an axial load of the shaft member, the predetermined surface possessing an area;
      the elastic member being made of an elastomer material;
      an accommodation member which accommodates the elastic member and receives the axial load of the shaft member via the elastic member;
      the accommodation member having an opening of an area smaller than the area of the predetermined surface, and the load sensor being configured to detect the load received from an exposed portion of the elastic member exposed from the opening; and
   a controller for controlling the electric motor on the basis of output of the load sensor.

2. A motor-driven parking brake apparatus according to claim 1, wherein a bearing for reducing frictional torque which the shaft member receives due to rotation of the shaft member is disposed between the predetermined surface of the elastic member and the other end of the shaft member.

3. A motor-driven parking brake apparatus according to claim 1, wherein the load sensor is a pressure sensor which detects a pressure generated due to the load received from the exposed portion of the elastic member.

4. A motor-driven parking brake apparatus according to claim 1, wherein the load sensor is a displacement sensor which detects an amount by which the exposed portion of the elastic member projects into the opening due to deformation of the exposed portion.

5. A motor-driven parking brake apparatus according to claim 4, wherein the displacement sensor includes:
   a movable member which moves in accordance with the projection amount of the exposed portion of the elastic member;
   a magnet which moves together with the movable member; and
   an element which generates an electrical output corresponding to movement of the magnet,
   wherein the load received from the exposed portion of the elastic member is detected on the basis of the electrical output of the element.

6. A motor-driven parking brake apparatus according to claim 5, wherein the displacement sensor includes first urging means for urging the movable member in a direction opposite the direction in which the exposed portion of the elastic member projects.

7. A motor-driven parking brake apparatus according to claim 6, wherein the displacement sensor further includes second urging means for allowing the entire elastic member to move within the accommodation member in accordance with the axial load of the shaft member within a range where the axial load of the shaft member is less than a predetermined value, so that within the range where the axial load of the shaft member is less than the predetermined value, the movable member moves in accordance with an amount of movement of the entire elastic member within the accommodation member rather than the projection amount of the exposed portion of the elastic member.

* * * * *